United States Patent
Campesi et al.

(10) Patent No.: US 8,736,549 B2
(45) Date of Patent: May 27, 2014

(54) SYSTEM AND METHOD FOR REMOTE CONTROL OF A COMPUTER

(75) Inventors: Robert Campesi, San Jose, CA (US); Yancy Chen, Campbell, CA (US); Benjamin Abraham, Cupertino, CA (US); Donald Gonzalez, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

(21) Appl. No.: 12/996,371

(22) PCT Filed: Jun. 4, 2008

(86) PCT No.: PCT/US2008/065752
§ 371 (c)(1),
(2), (4) Date: Dec. 3, 2010

(87) PCT Pub. No.: WO2009/148444
PCT Pub. Date: Dec. 10, 2009

(65) Prior Publication Data
US 2011/0080340 A1    Apr. 7, 2011

(51) Int. Cl.
G09G 5/08     (2006.01)
(52) U.S. Cl.
USPC .......................................... 345/157; 345/158
(58) Field of Classification Search
CPC ........ G06F 3/00; G06F 3/0304; G06F 3/0346
USPC ........................... 345/156–158, 734; 348/734
See application file for complete search history.

(56) References Cited

U.S. PATENT DOCUMENTS

| | | | |
|---|---|---|---|
| 5,952,996 A * | 9/1999 | Kim et al. | 345/158 |
| 6,304,895 B1 | 10/2001 | Schneider et al. | |
| 6,526,449 B1 | 2/2003 | Philyaw et al. | |
| 2005/0052345 A1 | 3/2005 | Bollhoefer | |
| 2008/0062250 A1 | 3/2008 | Rye et al. | |
| 2008/0077726 A1 | 3/2008 | Gilbert et al. | |
| 2008/0094353 A1 | 4/2008 | Marks | |

FOREIGN PATENT DOCUMENTS

| | | |
|---|---|---|
| DE | 20117645 | 3/2003 |
| JP | 17-136890 A | 5/2005 |
| JP | 2007-087100 A | 4/2007 |
| WO | WO03/079179 | 9/2003 |
| WO | WO2007/013652 | 2/2007 |
| WO | WO2007/024163 | 3/2007 |
| WO | WO2008/120189 | 10/2008 |

OTHER PUBLICATIONS

WIPO, PCT/US2008/065752, International Search Report, Jun. 4, 2008.
Campesi et al., UK IPO, First Office Action, dated Feb. 9, 2012, GB Pat. App. No. 1021894.9, filed Dec. 23, 2010.
Campesi, et al., Deutsches Patent—und Markenamt, First Office Action, dated Apr. 5, 2012, DE Pat. App. No. 112008003896.1, filed Dec. 3, 2010.
JP OA dated Nov. 27, 2012.

* cited by examiner

*Primary Examiner* — Regina Liang

(57) ABSTRACT

A remote control system for a computer, and a corresponding method include a Web camera having an image capture unit, the image capture unit including one or more devices capable of receiving imagery from multiple, distinct sections of the electromagnetic spectrum; a detection and separation module capable of detecting and separating the imagery into at least one signal capable of cursor control, wherein the signal capable of cursor control is generated by a remote control device; and a processing unit that receives the signal capable of cursor control and generates one or more cursor control signals, wherein the one or more cursor control signals include signals indicative of movement of the remote control device, the movement capable of translation to movement of a cursor displayed on a display of the computer.

19 Claims, 12 Drawing Sheets

SYSTEM AND METHOD FOR REMOTE CONTROL OF A COMPUTER

BACKGROUND

Web cameras are common computer peripherals that allow a user to broadcast images (usually of the user) to other computers. Web cameras are small cameras, (usually, though not always, video cameras) whose images can be accessed using the Internet, instant messaging, or a PC video conferencing application. The term webcam is also used to describe the low-resolution digital video cameras designed for such purposes, but which can also be used to record in a non-real-time fashion.

Web-accessible cameras involve a digital camera that uploads images to a web server, either continuously or at regular intervals. This may be achieved by a camera attached to a PC, or by dedicated hardware.

Web cameras typically include a lens, an image sensor, and some support electronics. Various lenses are available, the most common being a plastic lens that can be screwed in and out to set the camera's focus. Fixed focus lenses are also available, which require no adjustment. Image sensors can be complementary metal oxide semiconductors (CMOS) or charge coupled devices (CCD), the former being dominant for low-cost cameras, but CCD cameras do not necessarily outperform CMOS-based cameras in the low cost price range. Consumer webcams usually offer a resolution in the video graphics array (VGA) region, at a rate of around 25 frames per second. Higher resolution cameras also are available.

Support electronics are present to read the image from the sensor and transmit the image to the host computer. Some cameras—such as mobile phone cameras—use a CMOS sensor with supporting electronics "on die," i.e., the sensor and the support electronics are built on a single silicon chip to save space and manufacturing costs.

FIG. 1 illustrates a conventional personal computer system 10 having both a Web camera 11 and an infrared remote (IR) control feature. The Web camera 11 captures images of a user and can be used along with other components of the computer system 10 to broadcast or send those images to other sites, such as to other PCs coupled, for example, to the Internet. The image capture and transmission occur in real time. Also associated with the system 10 is an infrared remote control device 12 that can be used to control the personal computer system 10 (for example, to position a cursor on the monitor 20). For the remote control device 12 to operate, the personal computer system 10 also must include an infrared receiver 14 that can receive an infrared signal sent by the remote control device 12, and can then process the signal to provide the desired control function within the personal computer system 10. As used in the personal computer system 10, and as is common in any other personal computer system, the Web camera 11 and the infrared remote control system (the infrared receiver 14, associated software or firmware, and the infrared remote control device 12) are separate components with separate functions. These separate functions cost a user extra money to purchase the components.

SUMMARY

A remote control system for a computer is disclosed. The system includes a Web camera comprising an image capture unit, the image capture unit comprising one or more devices capable of receiving imagery from multiple sources; a detection and separation module capable of detecting and separating the imagery into at least one signal capable of cursor control, wherein the signal capable of cursor control is generated by a remote control device; and a processing unit that receives the signal capable of cursor control and generates one or more cursor control signals, wherein the one or more cursor control signals include signals indicative of movement of the remote control device, the movement capable of translation to movement of a cursor displayed on a display of the computer.

Also disclosed is a method for remote control of a computer. The method includes the steps of receiving, in an image capture device, an image signal comprising radiation from multiple sources; detecting, in the received image signal, a signal capable of cursor control; separating the signal capable of cursor control from the image signal; processing the separated signal capable of cursor control to generate a cursor control signal; and applying the cursor control signal to control movement of a computer cursor.

DESCRIPTION OF THE DRAWINGS

The detailed description will refer to the drawing drawings in which like reference numbers refer to like items, and in which.

DETAILED DESCRIPTION

Web cameras are common computer peripherals that allow a user to broadcast images (usually of the user) to other computers, typically over the Internet. Web cameras are capable of capturing transmissions from the infrared range of the electromagnetic spectrum. As disclosed herein, a Web camera system is adapted to use an infrared (IR) spectrum signal, or other visible signal, provided by a remote control device so as to position a cursor on a computer display and to perform other computer control functions.

Figure 2A:
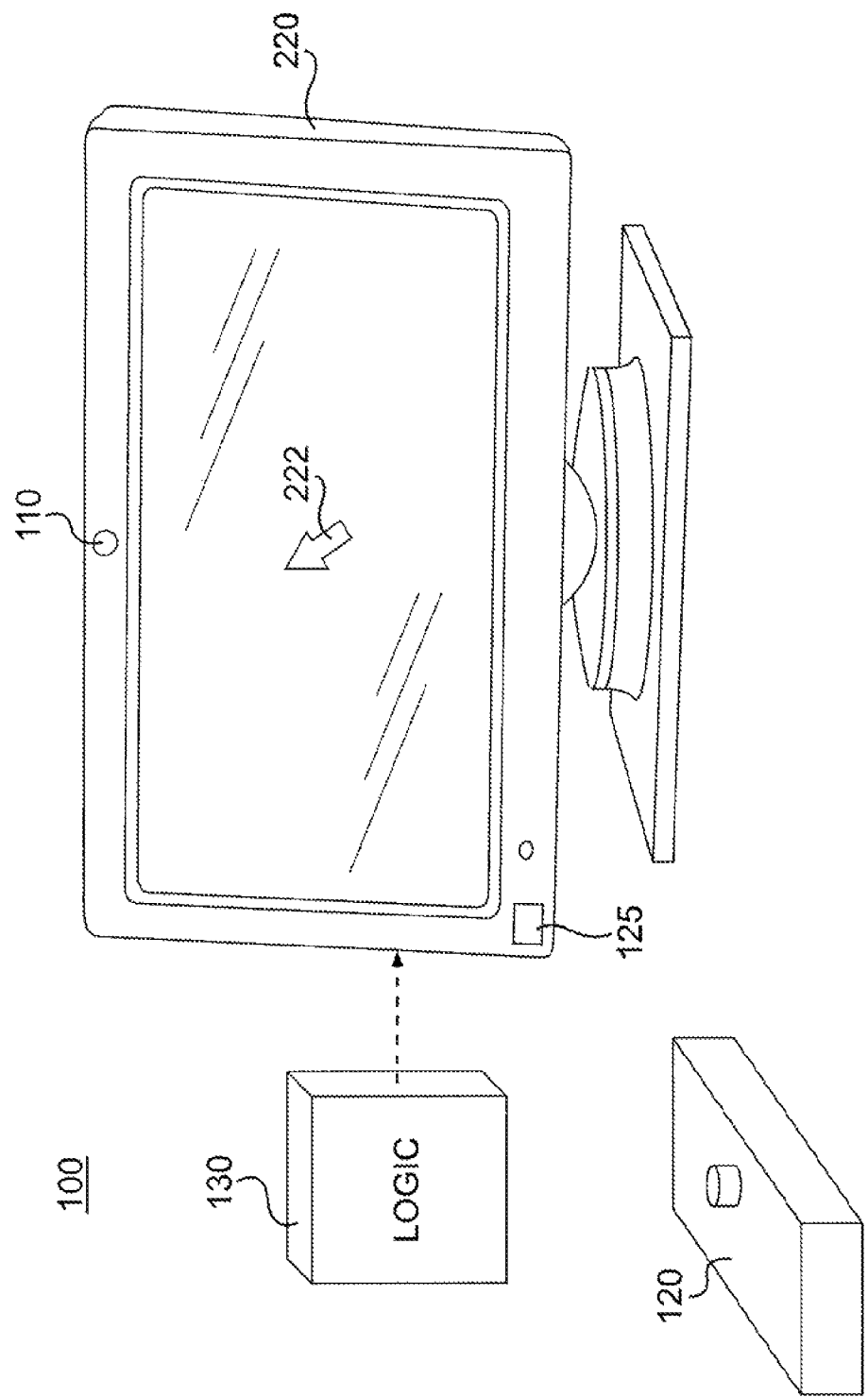
FIGS. 2A-2C illustrate an embodiment of a computer system in which a Web camera is used to enable remote control of features of the computer system.
Figure 2B:
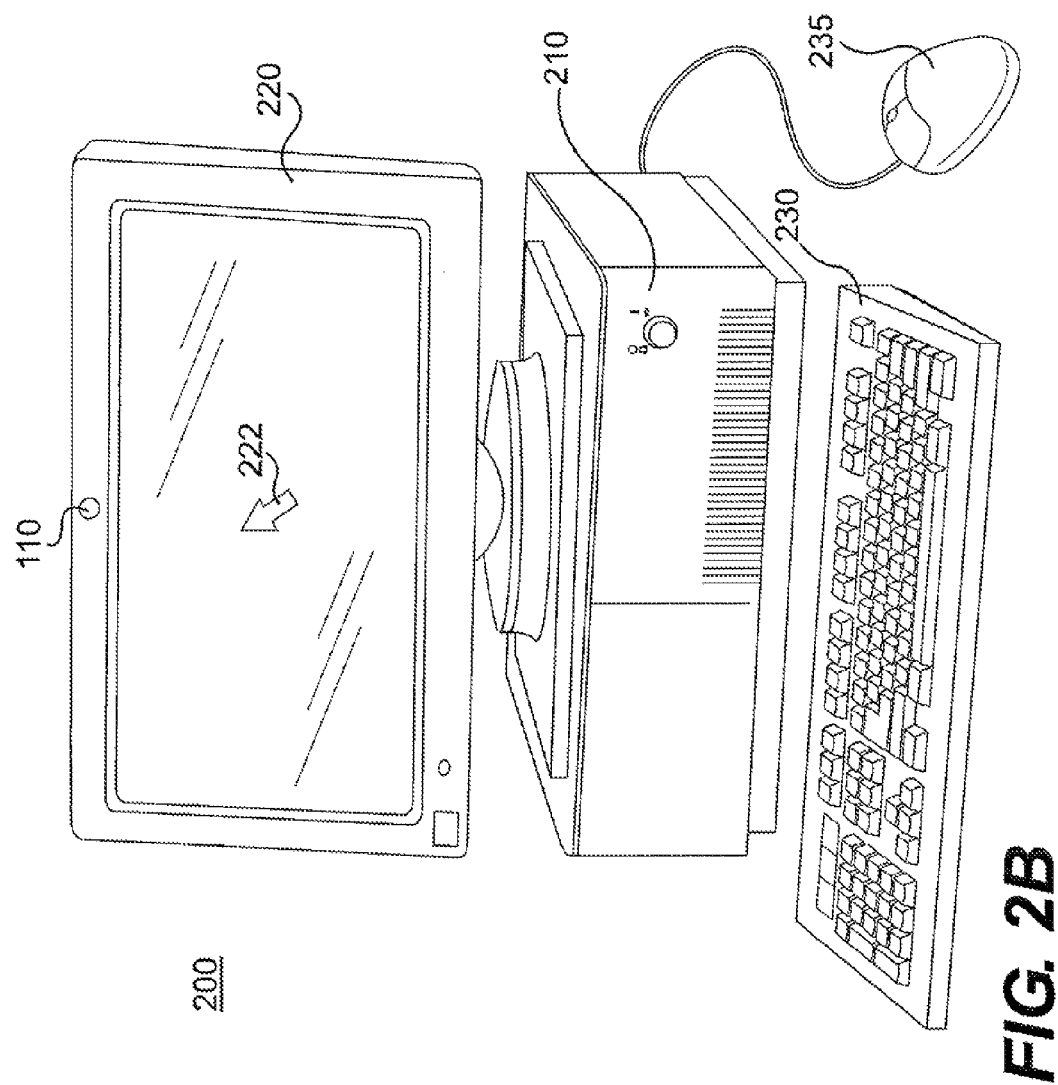

FIG. 2A illustrates an embodiment of a system 100 for on-screen cursor control using a remote control device and a Web camera. The system 100 is part of a larger computer system, an embodiment of which is shown in FIG. 2B. In FIG. 2B, computer system 200 includes a processor section 210, a display section 220, and a keyboard 230. Other standard computer components may be added to the computer system 200. The display section 220 may be a standard computer monitor, such as a flat panel display, for example. Shown on the display section 220 is a cursor 222, which can be positioned by the user operating one of several pointing devices, including, for example, a mouse 235. In an embodiment, the computer system 200 is a personal computer. However, other computer systems may be able to interact with the system 100.

Returning to FIG. 2A, the system 100 includes a Web camera 110, an infrared remote control 120, and associated logic 130. The logic 130 may be incorporated into the processor section 210 of FIG. 2B. The Web camera 110 may be any Web camera. In an embodiment, the Web camera 110 includes sensors (not shown in FIG. 2A) that are designed to detect infrared signals. The same sensors also can detect light corresponding to the visible image of a user. Finally, the sensors can detect light emitted, for example, from a light emitting diode (LED—not shown). Such a LED may be included with the remote control 120. In addition to reception of cursor control signals by way of the Web camera 110, the system 100 may include a separate infrared receiver 125, placed, for example as shown. However, inclusion of infrared signal reception by the Web camera 110 (or other control signal reception by the Web camera 110) may obviate the need for a separate infrared receiver.

The Web camera 110 will, of course, be capable of capturing electromagnetic emanations from different and distinct parts of the electromagnetic spectrum. As used herein, these different and distinct parts of the electromagnetic spectrum include, for example, infrared radiation and visible light, which for purposes of the herein disclosed embodiments, are considered. "different and distinct." As will be described later, processing circuitry and/or the logic 130 is capable of detecting the presence of a desired infrared signal within the overall electromagnetic emanation received at the Web camera 110, and separating out the infrared signal for further processing. In addition, the Web camera 110 may also receive infrared emanations from objects other than the remote control 120. Processing circuitry and/or the logic 130 is capable of distinguishing between the desired infrared control signals and unwanted infrared radiation.

In operation, with the Web camera 110 capturing images, a user handling the remote control 120 simply points the remote control 120 in the general vicinity of the Web camera 110, and then operates one or more buttons on the remote control 120. Certain of these buttons may be used to develop a signal to operate the on-screen cursor 222. The thus-developed signal may be an infrared signal $IR_s$. Alternatively, the thus-developed signal may be a visible light signal from another part of the electromagnetic spectrum.

The cursor control infrared signal $IR_s$ from the remote control 120 generally will be received coincident with other image signals $GI_s$ that are captured by the Web camera 110. In order to differentiate the signal $IR_s$ from the other image signals $GI_s$, or from any other infrared signals, the Web camera 110, or associated processing circuitry, may be configured to detect the infrared signal $IR_s$ and to separate the infrared signal $IR_s$ from the other image signals $GI_s$. Such detection could, for example, be based on a unique pattern of the infrared signal $IR_s$ generated by the remote control 120. Processing circuitry then further processes the separated infrared signal $IR_s$ to generate the desired cursor control signal.

Figure 2C:
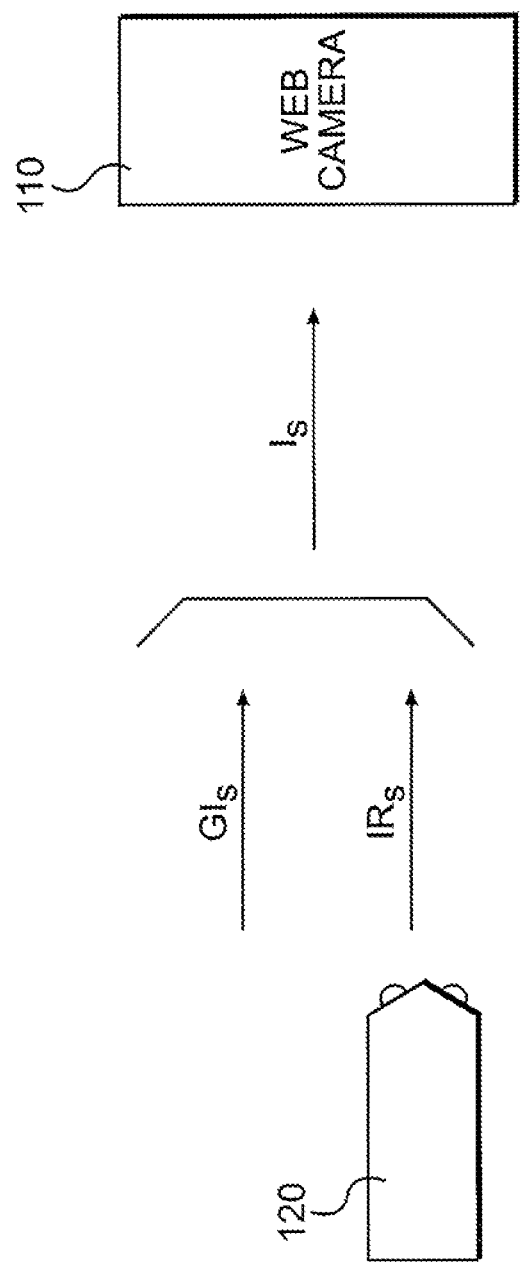

Referring to FIG. 2C, image signal Is includes general image signal $GI_s$ (e.g., a video image of a user) and infrared signals $IR_s$. Image signal $I_s$ is received at the Web camera 110 and the infrared portion is detected and separated by, for example, detector and separation module 410 (see FIG. 7).

Figure 3A:
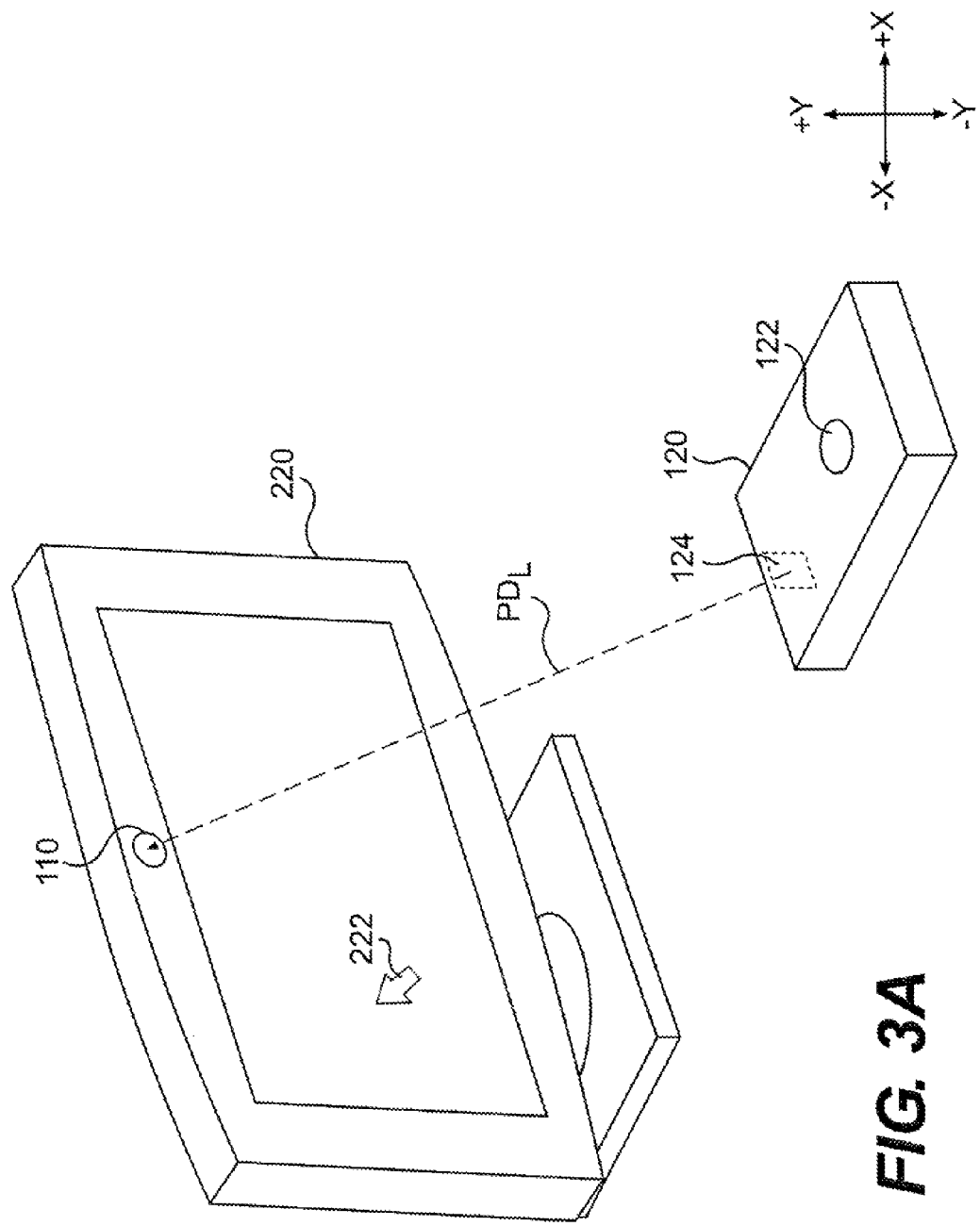
FIGS. 3A and 3B illustrate control features of the computer system of FIGS. 2A and 2B.
Figure 3B:
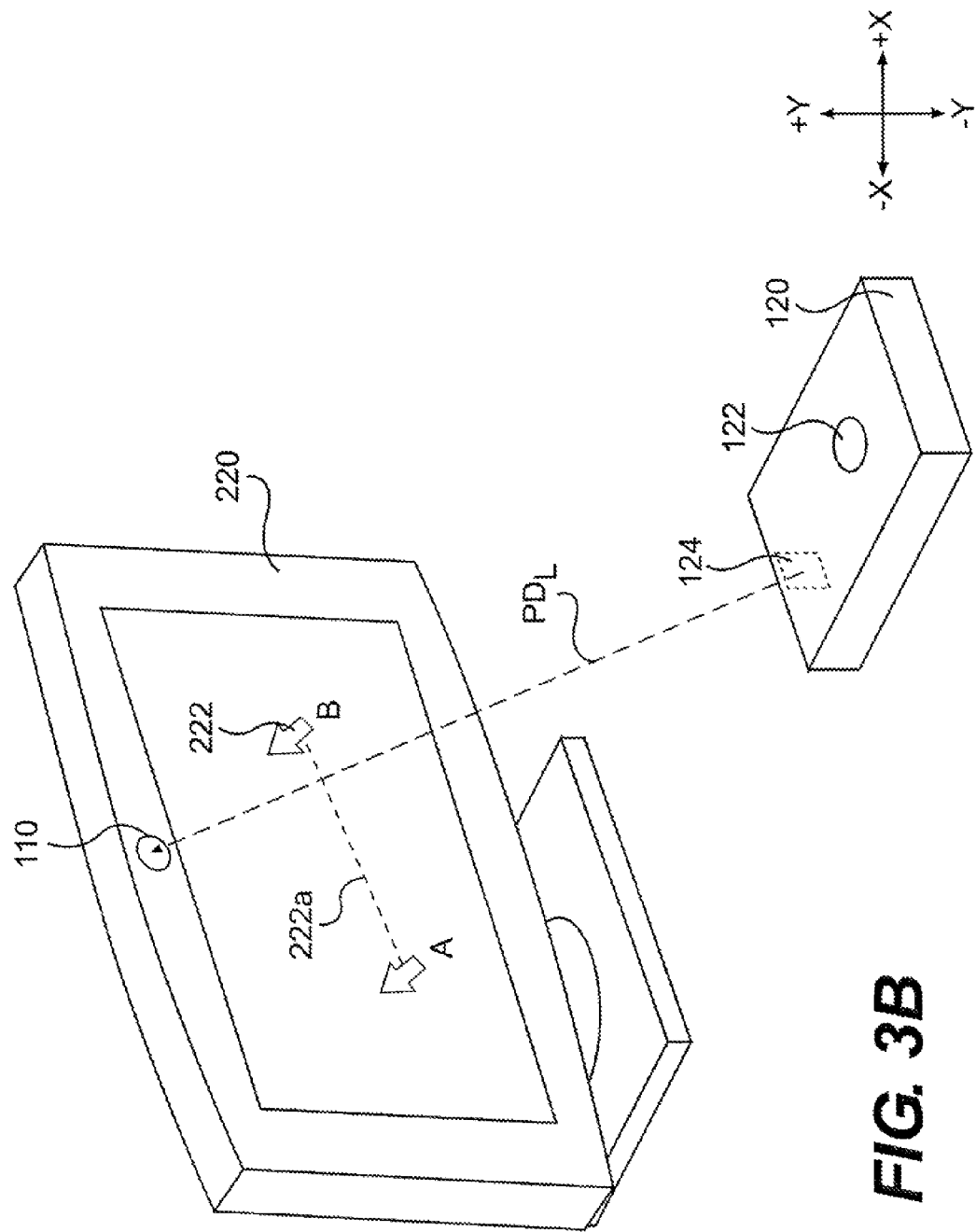

FIGS. 3A and 3B show relevant parts of the computer system 200 to which remote control 120 of the remote control system 100 is applied. FIG. 3A shows a positional state of the cursor 222 displayed on display section 220 before transmission of a remote control signal, and FIG. 3B shows a positional state of the cursor 222 after transmission of remote control signals.

In an embodiment, the remote control system 100 is an infrared optical remote control system that includes, as its main components, an optical remote control 120, which transmits, as one of the infrared signals $IR_s$, position detection signals $PD_L$, as remote control signals and one or more remote control receivers that receive the position detection signals $PD_L$ and recognize (detect) the details of a remote control instruction (displacement of the remote control 120) based on certain parameters of the signals. In the embodiment shown in FIGS. 3A and 3B, the remote control receivers include Web camera 110. In this embodiment, the position detection signal $PD_L$ is an infrared signal having a unique pattern detectable by the Web camera 110. Furthermore the infrared signals $IR_s$ may include an infrared enable signal that enables initial control of the cursor 222 by the remote control 120, as well as control of other on-screen functions.

Figure 1:
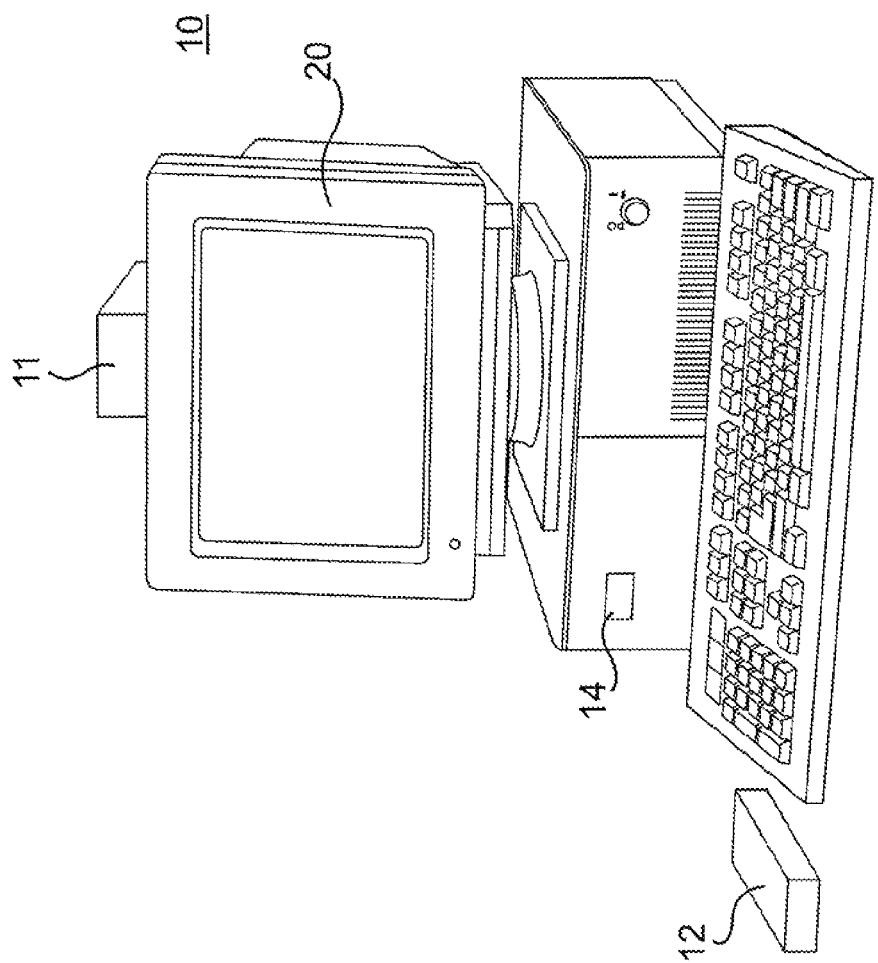
FIG. 1 illustrates a conventional computer system employing a Web camera.

In the computer system 200, remote control using the system 100 is performed for the cursor 222, which is shown as a pointer displayed on the display section 220. The Web camera 110 is illustrated as contained in a front frame portion of the display device 220, but the Web camera 110 may be disposed in other locations, such as that shown in FIG. 1, for example.

The remote control 120 is operated (e.g., panned) in a free space, and therefore a central axis 121 of the remote control 120 can be described to move in a first axis direction X (for example, corresponding to a horizontal direction), a second axis direction Y (for example, corresponding to a vertical direction that is orthogonal to the horizontal direction), or in a direction that is inclined to these directions. Although the first axis direction X and the second axis direction Y are shown as orthogonal to each other, in other embodiments, the axes may intersect at an angle close to a right angle such that a light signal in the first axis direction X and a light signal in the second axis direction Y can be distinguished and detected.

The system 100 is configured such that the position detection signals $PD_L$ transmitted from the remote control 120 are received by the Web camera 110, and the panning state of the remote control 120 is detected based on the certain parameters (e.g., magnitude of absolute values and relative ratio) of the received and detected position detection signals $PD_L$. The received and detected position detection signals $PD_L$ are then used by the logic 130, contained within other components of the computer system 200, to position the cursor 222 according to the panning state (for example, panning to the right and panning to the left). As used herein, the logic 130 may be software, hardware, firmware, or any combination thereof.

FIG. 3A shows the cursor 222 before movement, and FIG. 3B shows the cursor 222 after movement along movement trajectory 222a. That is, when the remote control 120 is panned from −X to +X, the cursor 222 displayed on the display section 220 is panned from the left (−X) to the right (+X) on the display, corresponding to the panning.

Figure 4B:
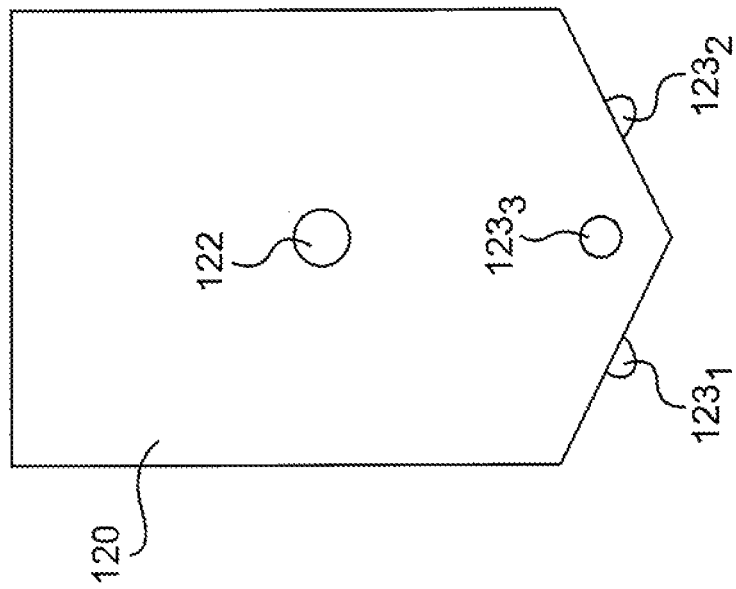
FIGS. 4A and 4B illustrate an embodiment of a remote control device used with the computer system of FIGS. 2A and 2B.
Figure 4A:
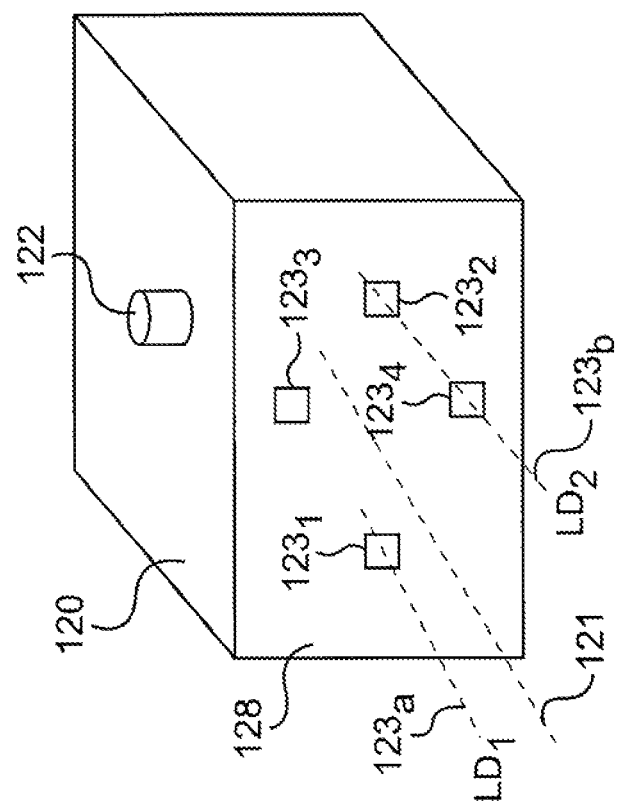

In order to achieve X-Y positional control of the cursor, the remote control 120 may be configured with a plurality of light emitting elements (which may emit infrared light, or other light signals) around central axis 121 as a reference axis serving as a positional reference corresponding to the transmission direction of the position detection signal $PD_L$, as shown in FIG. 4A. A first light-emitting element $123_1$ and a second light-emitting element $123_2$ are disposed on a front panel 128 of the remote control 120 and are spaced apart from each other such that they are symmetrical with respect to the central axis 121 of the remote control 120 in a horizontal direction. That is, the intersection point between the central axis 121 and the horizontal direction X can be defined as an origin, and the first light-emitting element $123_1$ and the second light-emitting element $123_2$ are arranged symmetrically with respect to the origin.

The first light-emitting element $123_1$ has a light axis $123a$ and a light intensity distribution characteristic or pattern $LD_1$. The second light-emitting element $123_2$ has a light axis $123_b$ and a light intensity distribution characteristic or pattern $LD_2$. The light axes $123_a$ and $123_b$ are shown inclined, in opposite directions with respect to the central axis 121 in order to improve the sensitivity and the accuracy (see FIG. 4B). Optionally, a similar effect can be achieved by widening the space between the first light-emitting element $123_1$ and the second light-emitting element $123_2$.

In an embodiment, the position detection signals $PD_L$ from the first and the second light-emitting elements $123_1$, $123_2$ can be distinguished by making the emission timing of these signals different from each other. For example, the remote control 120 may be configured so as to transmit the position detection light signal $PD_L$ as a pulse position modulation (PPM) signal by driving the first light-emitting element $123_1$ and the second light-emitting element $123_2$ by a time division driving system. Pulse position modulation minimizes the effect of scattering light, EMC (electromagnetic compatibility) noise and, other influences.

When the light axis $123a$ of the first light-emitting element $123_1$ is caused to be, for example, directly facing the Web camera 110 by horizontally moving the remote control 120, the amount of light from the first light-emitting element $123_1$ becomes larger than the amount of light from the second light-emitting element $123_2$. Accordingly, rightward movement of the remote control 120 can be detected by the Web camera 110.

In addition to the above-described horizontal control of the cursor 222, vertical control can be exercised using a similar process (light emitting elements $123_3$ and $123_4$), resulting in two-dimensional position control of the cursor 222.

Although FIGS. 4A and 4B show the arrangement of the first light-emitting element $123_1$ to the fourth light-emitting element $123_4$ as cross-shaped, the remote control 120 is not limited to this configuration. For example, the light emitting elements can be arranged in a T-shaped or L-shaped configuration. That is, in each of the first axis direction X and the second axis direction Y, the corresponding two light-emitting elements may be arranged symmetrically with respect to the central axis 121.

The remote control 120 may include various control features to initiate infrared control of the cursor 222, and to thereafter move the cursor 222 in a desired direction. In an embodiment, the remote control 120 includes a button 122 that is operated to initiate infrared remote control. A subsequent operation of the button 122 turns off the infrared remote control feature.

Furthermore, although the remote control 120 of FIGS. 4A and 4B has been shown with four light emitting elements, the remote control 120 is not so limited, and other numbers and arrangements of light emitting elements may be provided. For example, the remote control 120 may use one light emitting element. In this configuration, movement of the cursor 222 still may be obtained by panning the remote control 120. In another embodiment, a single button, in the form of a toggle, is operated to both initiate infrared control and to subsequently position the cursor 222. Other means are possible for initiation and operation of the cursor 222. Thus, movement of the toggle in two dimensions is translated into movement of the cursor 222 in two dimensions, and the remote control 120 may be held stationary or near stationary.

Still further, the same button 122, or a similar button may be used to allow the cursor 222 to initiate other normal computer-related cursor operations, such as "drag and drop" and "item selection."

Figure 5:
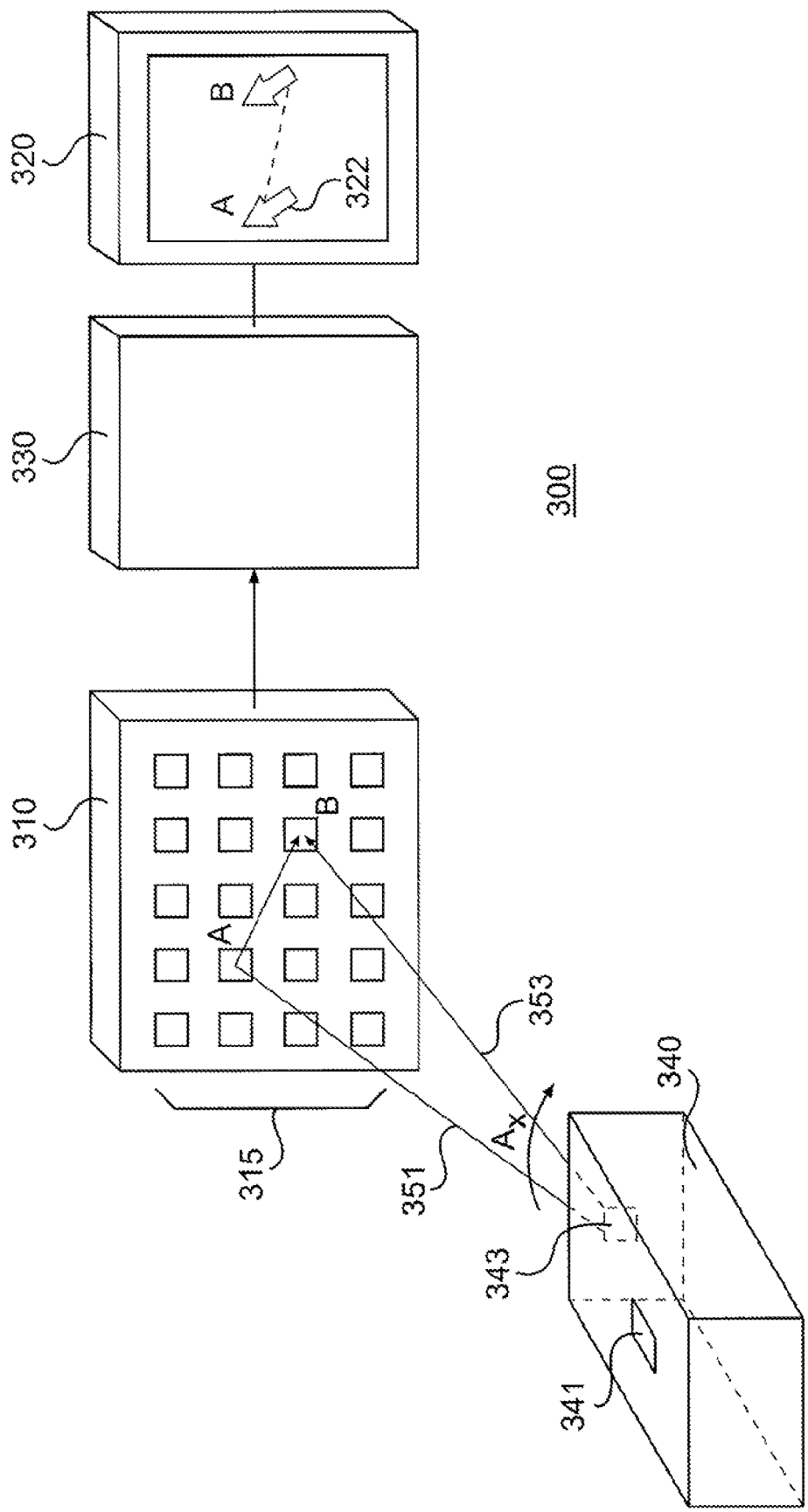
FIG. 5 illustrates an alternative embodiment of a computer system employing remote control using a Web camera.

Other means are possible for controlling the two-dimensional movement of the on-screen cursor. In an embodiment, a Web camera receiving unit, which includes of an array of CCDs, receives a light signal $I_s$ including, for example, an infrared signal $IR_s$ having a unique pattern that can be recognized from a remote control device, and correlates the movement of the signal $IR_s$ across the array of CCDs with a corresponding position on the computer display section 220. This embodiment is illustrated in FIG. 5. As shown, computer system 300 includes a camera system 310 having an array 315 of CCDs or similar image capture devices. Coupled to the camera system 310 is a processor 330, which servers, inter alia, to process image information captured by the CCD array 315. The processor 330 in turn is coupled to a display section 320 upon which is shown a cursor 322. Finally, a remote control 340 is used to activate the cursor 322 and to control its movement in two dimensions across the display section 320. The remote control includes a cursor control 341 and a light emitting device 343.

Also shown in FIG. 5 is a translation of the cursor 322 on the display section 320 from starting point A to ending point B. This translation may be controlled by operation of the remote control 340. For example, by panning the remote control 340 from left to right through arc $A_x$, a central axis 351 of the light emitting device 343 can be made to move from point A on the CCD array 315 to point B on the CCD array 315, with the result that a central axis 353 now points to a different point on the CCD array 315. This translation across the CCD array is detected and processed by the processor 330 to provide the corresponding translation of the cursor 322 from point A to point B on the display section 320.

In the above-described embodiments, the display section of the computer system may display the on-screen cursor at all times. The on-screen cursor may controllable by more than one device. For example, the on-screen cursor may be controlled by the mouse 235 of FIG. 2B. However, when the remote control devices (e.g., remote controls 120 and 340) are activated, control of the on-screen cursor is enabled by the corresponding remote control device. To enable such remote control, a user may operate the remote control device's cursor control. For example, a user may operate the cursor control 341 (see FIG. 5) to allow remote control of the cursor 322 by light emission from the remote control 340.

Figure 6:
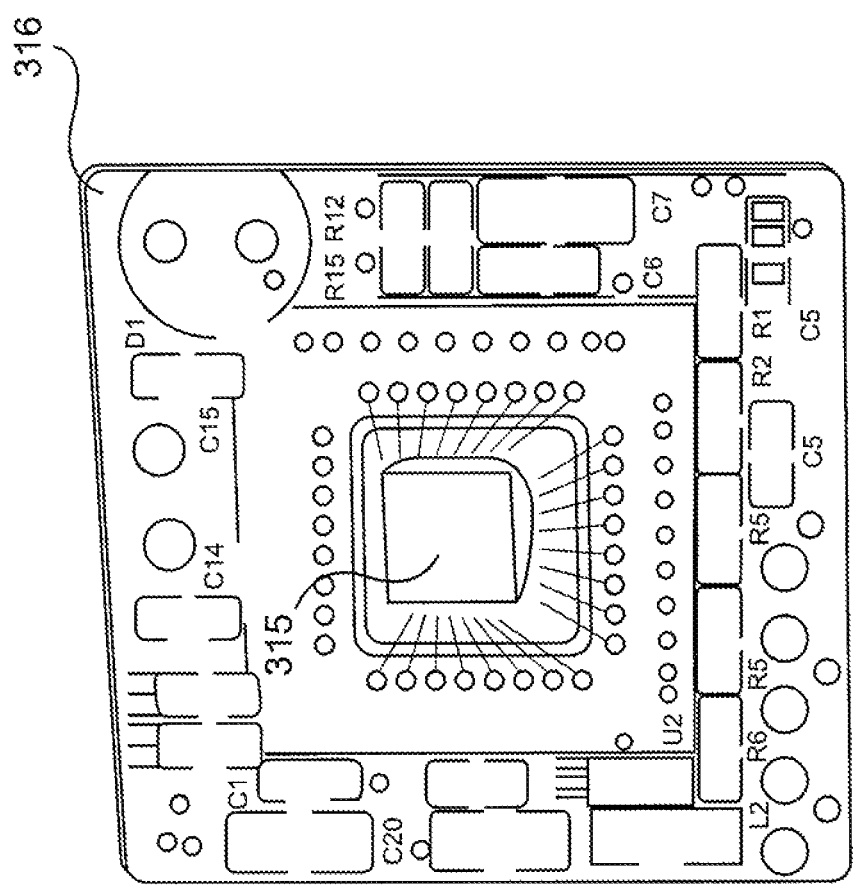
FIG. 6 illustrates an exemplary image capture array, and associated electronics, of the Web camera of FIG. 2A.

FIG. 6 illustrates an exemplary image capture array, and associated electronics, of the Web camera of FIG. 5. As shown, a CCD array 315 is disposed on circuit board 316, onto which are installed various electronic circuit elements. These electronic elements are used as part of the processing circuitry and/or the logic 130 to transform the light signal $I_s$ into a control signal to cause movement of the on-screen cursor (e.g., the cursor 222 of FIG. 2A).

Figure 7:
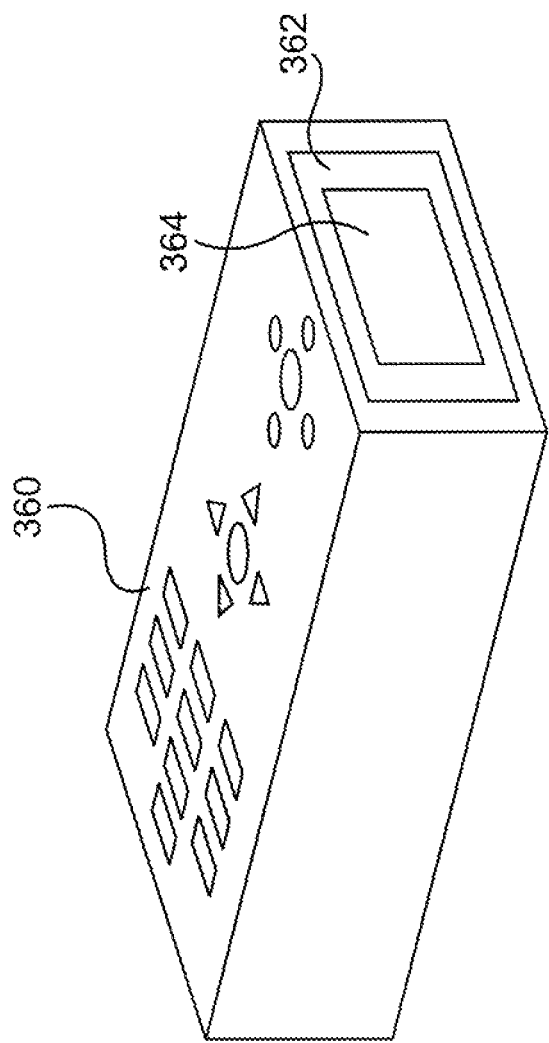
FIG. 7 illustrates an embodiment of a remote control that uses a reflector to gather and focus infrared light.

FIG. 7 illustrates an embodiment of yet another remote control device for use with the Web camera 110 to control positioning of the cursor 222 (see FIG. 2B). In FIG. 7, a remote control 360 is shown with an optical window 362. Behind the optical window 362 is a reflector 364, which captures an IR signal from another source, focuses the IR signal, and directs the IR signal to the image capture device of the Web camera 110, where the IR signal is used to create a cursor control signal. The remote control 360 may operate in all other respects in the manner of the remote control 340 shown in FIG. 5. Other sources of infrared emissions that may be used with the remote control 360 include an infrared signal generated by the Web camera 110 itself, and infrared emissions generated by other sources, such a room (artificial) lighting, sunlight, and similar sources, for example.

Figure 8:
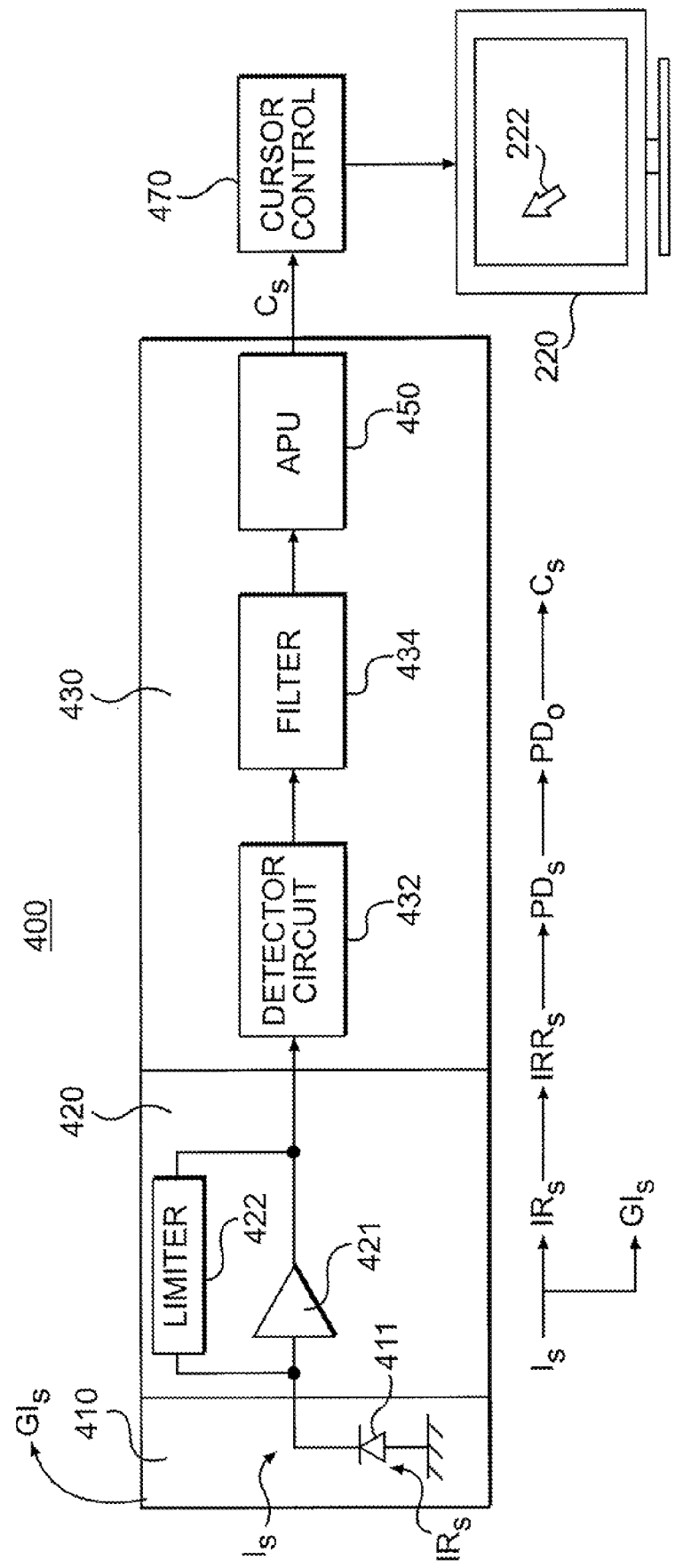
FIG. 8 illustrates an exemplary circuit configuration for controlling an on-screen cursor using the Web camera of FIG. 2A.

FIG. 8 is an exemplary circuit for controlling an on-screen cursor using a Web camera. Elements of the circuit shown in FIG. 8 may be located within the Web camera 110 (see FIG. 2A) and/or in the processor section 210 or the display section 220 (see FIG. 2B).

Infrared signal $IR_s$ emitted from the remote control 120 (see FIG. 2A) is received by a detection and separation circuit 410, which recognizes a unique pattern to the received signal $IR_s$ and separates the signal $IR_s$ from other signals $GI_s$ received at the Web camera 110. The thus separated signal $IR_s$ is provided to a photodiode 411, or similar device included in the light-receiving unit of the Web camera 110, photoelectrically converted, and input to an IR-reception signal processing unit 420 as IR-reception signals $IRR_s$.

The IR-reception signal processing unit 420 includes, in a front stage, an amplifier 421 that amplifies the signal IRRs into a signal in a fixed range (amplitude) so that signal processing can be performed reliably, and a limiter 422 that is connected to the amplifier 421 so as to form a feedback loop and adjust the amplitude of the signal to a fixed range. Other amplifiers and a band pass filters may be connected downstream of the amplifier 421 and needed to further process the signal $IRR_s$. The IR-reception signal processing unit 420 outputs position detection signals $PD_s$ corresponding to each of the input signals IRRs to a displacement detection unit 430.

The displacement detection unit 430 includes a detector circuit 432, a noise filter 434, and an arithmetic processing unit (APU) 450. The detector circuit 432 performs wave form transformation processing on the position detection signals $PD_s$ to obtain position detection output signals $PD_o$ corresponding to each of the input signals $IRR_s$. The circuit 432 removes the modulation waves from the position detection reception signals $PD_s$ containing modulation waves to obtain an envelope. That is, the position detection output signals $PD_o$ can be converted into amplitude values indicative of desired cursor motion.

The noise filter 434 may comprise a capacitor-resistor (CR) filter, an inductor-capacitor (LC) filter, or similar circuit arrangement, and removes noise that cannot be removed in the light-reception signal processing unit 420.

The arithmetic processing unit 450 detects the state of movement (displacement) of the remote control 120 by performing digital computation on position detection output signals $PD_o$, and outputs a control signal $C_s$ to a cursor control module 470 that controls the position of the cursor 222. The arithmetic processing unit 450 and the cursor control module 470 may be configured by using processing units contained, in the Web camera 110, the display section 220, or the processing section 210, or any combination of these elements. Moreover, the processing functions may include software features, hardware features, firmware, or any combination thereof.

Figure 9:
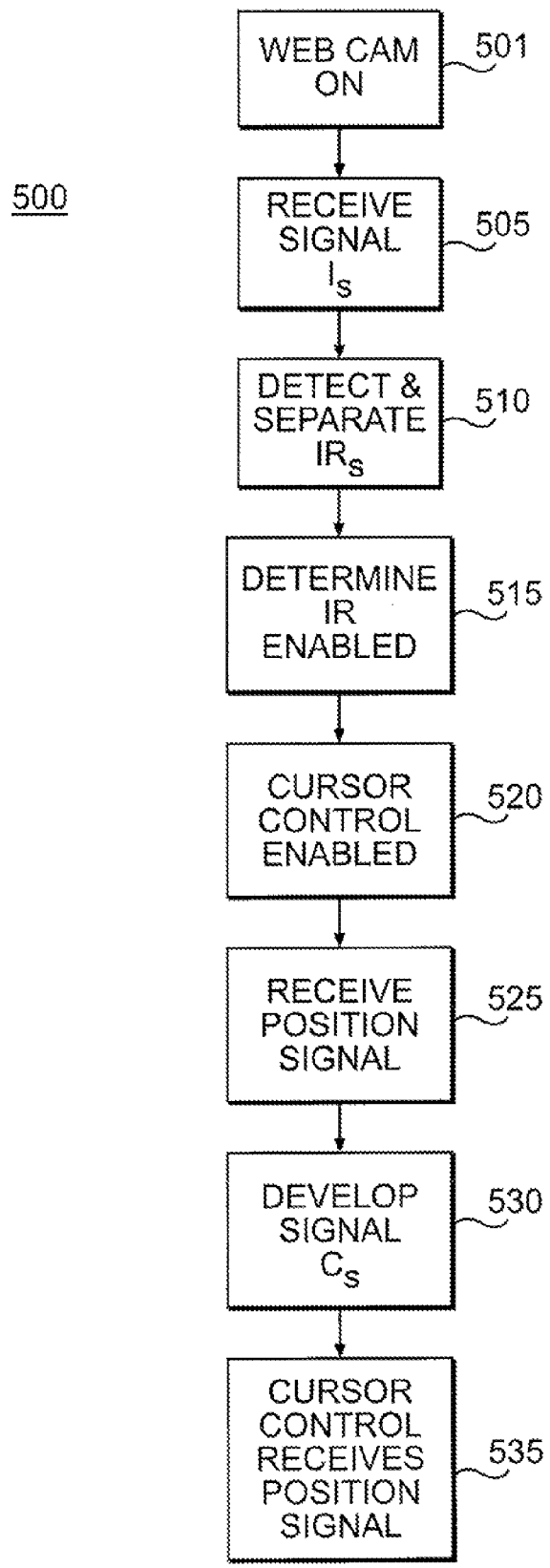
FIG. 9 is a flow chart of an exemplary cursor control operation using a Web camera.

FIG. 9 is a flow chart illustrating an exemplary cursor control operation 500 using the Web camera 110 of FIG. 2A and the computer system of FIG. 2B. The operation 500 begins with block 501, when the Web camera 110 is switched on, and the computer system 200 is operating. In block 505, the Web camera 110 receives a signal $I_s$. In block 510, detection and separation module 410 determines that the signal $I_s$ includes a defined infrared signal, and proceeds to separate the infrared signal from the other signals $GI_s$. In block 515, processing logic determines that the infrared signal is a signal to enable remote control of cursor 222 using remote control 120. In block 520, the cursor control module receives a signal from the processor section 210 enabling remote control of the cursor 222 by the remote control 120. The cursor 222 is displayed on the display section 220.

In block 525, the Web camera 110 receives position detection signals $PD_L$ corresponding to a panning motion of the remote control 120 in the X and Y directions (e.g., the Web camera 110 receives four separate signals $PD_L$). The received signals $PD_L$ are converted into voltage amplitude signals by the ARU 450 to develop the control signal $C_s$ (block 530). The cursor control module 470 receives (block 535) the control signal $C_s$, and positions the cursor 222 accordingly.

The above description refers to a few specific embodiments. These embodiments are illustrative of the inventions recited in the claims that follow, and should not be construed as limiting those inventions. Various modifications may occur to those skilled in the art without departing from the spirit and scope of the inventions.

The invention claimed is:

1. A system, comprising:
  a Web camera comprising an image capture unit, the image capture unit comprising one or more devices to receive imagery from multiple sources;
  a detection and separation module to detect and separate the imagery into at least one signal for cursor control, wherein the signal for cursor control is generated by a remote control device; and
  a processing unit to receive the signal for cursor control and generate one or more cursor control signals, wherein the one or more cursor control signals include signals generated by a plurality of light emitting elements arranged on the remote control device to generate position detection signals indicative of movement of the remote control device, the movement of the remote control for translation to movement of a cursor displayed on a display of the computer,
  wherein a difference in an amount of light received from the plurality of light emitting elements is used to detect the movement of the remote control device.

2. The system of claim 1, wherein the multiple sources comprises sources emitting radiation from distinct sections of the electromagnetic spectrum, and wherein the signal for cursor control is an infrared signal.

3. The system of claim 1, wherein the cursor is moveable in an X-Y plane.

4. The system of claim 1, wherein the cursor control signals include a cursor enable signal.

5. The system of claim 1, wherein the cursor control signals include a cursor translation signal.

6. The system of claim 1, wherein the signal capable of cursor control is a signal in the visible range generated by one or more light emitting diodes.

7. The system of claim 1, further comprising an array of image capture elements to capture the signal for cursor control, and the processing unit being to process the captured signal and map positions of the image capture elements to corresponding positions on the computer display.

8. The system of claim 7, wherein the image capture elements are charged coupled devices (CCDs).

9. A method, comprising:
  receiving, in an image capture device, an image signal comprising radiation emitted from multiple sources;
  detecting, in the received image signal, a signal for cursor control;
  separating the signal for cursor control from the image signal;
  processing the separated signal for cursor control to generate a cursor control signal; and applying the cursor control signal to control movement of a computer cursor, wherein the signal for cursor control is received from a plurality of light emitting elements arranged on a remote control device to generate position detection signals indicative of movement of the remote control device, and a difference in an amount of light received from the plurality of light emitting elements is used to detect the movement of the remote control device.

10. The method of claim 9, wherein the multiple sources emit radiation from separate, distinct portions of the electromagnetic spectrum, and wherein the signal for cursor control is an infrared signal.

11. The method of claim 9, wherein the signal for cursor control includes a signal to initiate remote control of the computer cursor.

12. The method of claim 9, wherein the cursor control signal comprises an X-Y direction control signal.

13. The method of claim 9, further comprising:

receiving and processing a signal to execute a drag and drop feature; and receiving and processing a signal to select an item from a list of items displayed on a computer display.

14. A system, comprising:

remote control means for generating a remote control signal for reception by a Web camera, the remote control means comprising a plurality of light emitting means arranged on the remote control means for generating position detection signals indicative of movement of the remote control means and;

means for receiving the generated remote control signal;

detection and separation means for detecting the received remote control signal and for separating the received remote control signal from other signals received at the Web camera;

means for processing the separated signal to provide cursor control signals; and means for applying the cursor control signal to a computer cursor, wherein a difference in an amount of light received from the plurality of light emitting means is used for detecting the movement of the remote control means.

15. The system of claim 14, wherein the plurality of light emitting means comprise infrared remote control means.

16. The system of claim 15, wherein the remote control means comprises a reflector that gathers and focuses infra red light external to the remote control means.

17. The system of claim 15, wherein the infrared remote control means are to indicate motion of the remote control means in a X-Y plane.

18. The system of claim 14, wherein the plurality of light emitting means comprise means for emitting visible light signals.

19. The system of claim 14, wherein the means for receiving the remote control signal comprises a CMOS device.

* * * * *